Oct. 6, 1925.
F. BODINE
FRUIT COLLECTOR
Filed Feb. 8, 1924
1,556,480
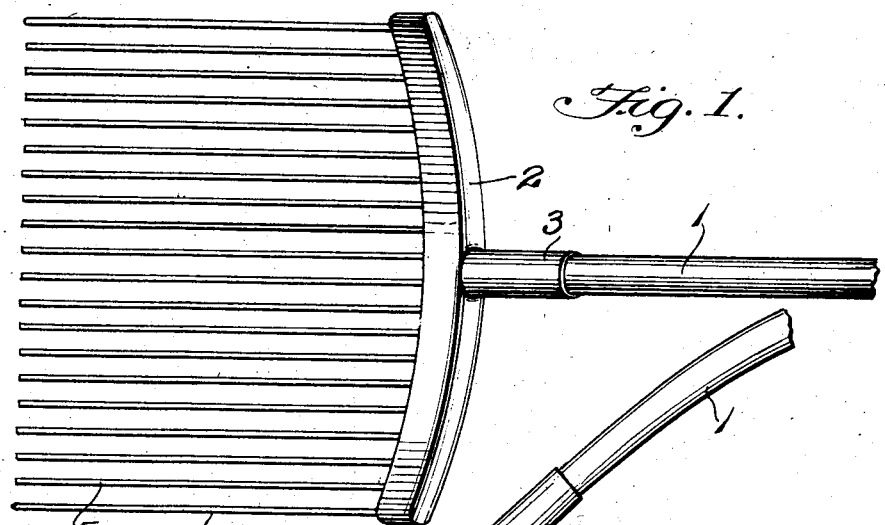
Fig. 1.
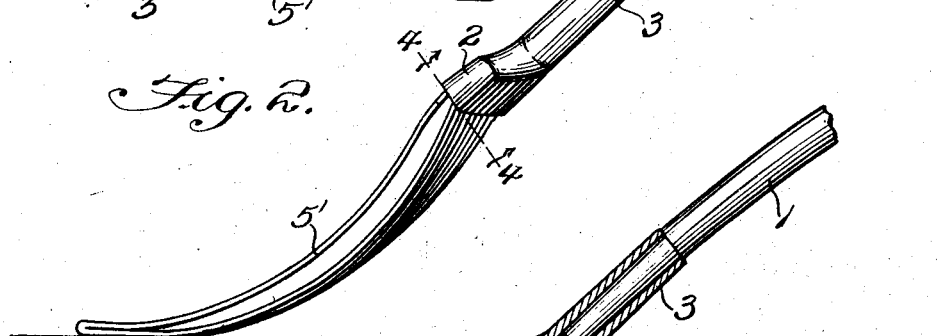
Fig. 2.
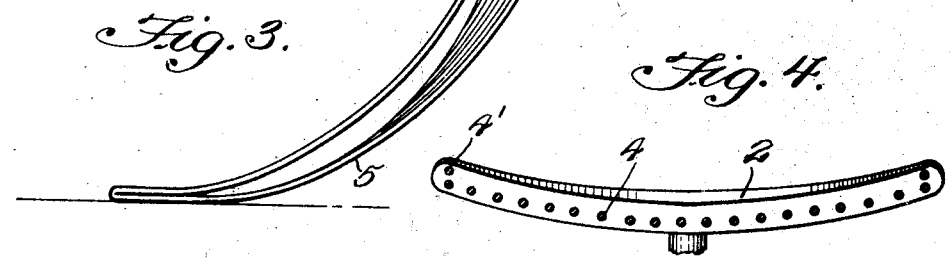
Fig. 3.
Fig. 4.
Frank Bodine
INVENTOR
BY Victor J. Evans
ATTORNEY
WITNESS:

Patented Oct. 6, 1925.

1,556,480

UNITED STATES PATENT OFFICE.

FRANK BODINE, OF VISALIA, CALIFORNIA.

FRUIT COLLECTOR.

Application filed February 8, 1924. Serial No. 691,458.

*To all whom it may concern:*

Be it known that I, FRANK BODINE, a citizen of the United States, residing at Visalia, in the county of Tulare and State of California, have invented new and useful Improvements in Fruit Collectors, of which the following is a specification.

This invention relates to a fruit fork, the general object of the invention being to provide a device for picking up fruit such as prunes from the ground.

Another object of the invention is to so form the device that a considerable quantity of fruit can be carried thereby before it is necessary to dump the fruit.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a front view of the device.

Figure 2 is an edge view thereof.

Figure 3 is a longitudinal sectional view.

Figure 4 is a section on line 4—4 of Figure 2.

In these views, 1 indicates the handle of the device and 2 indicates a cross frame which is formed with a socket 3 at its center for receiving the handle. This cross frame is of curved shape, as shown, and is provided with perforations 4 for receiving the tines 5. The tines are formed of wire and the like and each end tine 5' is formed of a loop or wire so that it is of double construction with one half arranged above the other half, there being an additional perforation 4' at each end of the cross frame to receive the upper member. The double tines 5' form side edges for the device to prevent the fruit from rolling off at the sides of the device and the tines are of curved construction, as shown in Figures 2 and 3, so as to produce a body of convex shape which forms a receptacle for receiving the fruit when the device is being used. This curved shape of the tines and the double tines forming edges at the sides of the device will enable the device to be used for a considerable time in picking fruit before it is necessary to dump the fruit collected.

The device can be slid along the ground so that the tines will run under the fruit and pick it up off the ground. The device is tipped downwardly at intervals so that the fruit will roll into the curved portion of the device.

By this device fruit such as prunes and the like can be easily and quickly picked from the ground and thus do away with the laborious task of picking up the fruit by hand.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a curved cross frame, a handle connected with the center thereof, tines carried by the cross frame, the end tines being of double construction with one half arranged above the other half so as to form edges at the sides of the device.

2. A device of the class described comprising a curved cross frame, a handle connected with the center thereof, tines carried by the cross frame, the end tines being of double construction with one half arranged above the other half so as to form edges at the sides of the device and all of the tines being of curved construction to make the front portion of the device of concaved shape.

In testimony whereof I affix my signature.

FRANK BODINE.